(12) United States Patent
Sayeed

(10) Patent No.: US 6,456,653 B1
(45) Date of Patent: Sep. 24, 2002

(54) FAST AND ACCURATE SIGNAL-TO-NOISE RATIO ESTIMATION TECHNIQUE FOR OFDM SYSTEMS

(75) Inventor: Zulfiquar Sayeed, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/382,848

(22) Filed: Aug. 25, 1999

(51) Int. Cl.$^7$ ................................................ H04J 1/16
(52) U.S. Cl. ...................... 375/227; 375/260; 370/252; 370/343
(58) Field of Search .................. 375/224, 227, 375/260; 370/252, 343; 702/69; 455/67.3, 226.3

(56) References Cited

U.S. PATENT DOCUMENTS 5,726,978 A * 3/1998 Frodigh et al. ............. 370/252
5,818,872 A * 10/1998 Gupta ......................... 375/222
6,411,662 B1 * 6/2002 Sakoda et al.

OTHER PUBLICATIONS

Ove Edfors et al. "An introduction to orthogonal frequency–division multiplexing", Sep. 1996, Lulea University of Technology, pp. 1–50.*

John G. Proakis, "Digital Communications" $2^{nd}$. edition, 1989, McGraw–Hill Inc., pp. 721–733.*
William C. Jakes, "Microwave Mobile Communications", 1974, IEEE Press, pp. 399–423.*
William C. Y. Lee, "Mobile communications Design Fundamentals", $2^{nd}$. edition, 1993, John Wiley & Sons Inc., pp. 119–126.*
Michel Daoud Yacoub, "Foundations of Mobile Radio Engineering", 1993, CRC Press, pp. 192–194.*

(List continued on next page.)

*Primary Examiner*—Amanda T. Le
(74) *Attorney, Agent, or Firm*—Morgan & Finnegan, LLP

(57) ABSTRACT

A method and apparatus for estimating the signal-to-noise ratio in Orthogonal Frequency Division Multiplexing (OFDM) and Discrete Multi-tone (DMT) systems is disclosed. In all OFDM and DMT systems, the transmitter uses an Inverse Fast Fourier Transform (IFFT) of a significantly longer length than the number of sub-carriers that are used for information transmission (i.e., the active sub-carriers). The additional IFFT buffer locations (i.e., the inactive sub-carriers) are filled with zeroes. At the receiver, after the FFT operation, the active sub-carriers will contain the signal plus noise information whereas the inactive sub-carriers will contain only noise. Hence, the signal-to-noise ratio can be estimated quickly and accurately by determining the noise power of the inactive sub-carriers and the signal plus noise power of the active sub-carriers; subtracting the noise power of the inactive sub-carriers from the signal plus noise power of the active sub-carriers to obtain the signal power; and dividing the signal power by the noise power to obtain the SNR.

12 Claims, 4 Drawing Sheets

OTHER PUBLICATIONS

Timothy M. Schidl et al., "Robust Frequency and Timing Synchronization for OFDM", Dec. 1997, IEEE Transactions on Communications, vol. 45, No. 12, pp. 1613–1621.*

Jan–Jaap van de Beek et al., "ML Estimation of Time and Frequency Offset in OFDM Systems", July 1997, IEEE Transactions o Signal Processing, vol. 45, No. 7, pp. 1800–1805.*

Paul H. Moose, "A Technique for Orthogonal Frequency Division Multiplexing Frequency Offset Correction", Oct. 1994, IEE Transactions on Communications, vol. 42, No. 10, pp. 2908–2914.*

Louis Thibault et al., "EIA/NRSC DAR Systems Subjective Test, Part II: Transmission Impairments", Dec. 1997, IEEE Transactions on Broadcasting, vol. 43, No. 4, pp. 353–369.*

Leonard J. Cimini Jr., "Analysis and Simulation of a Digital Mobile Channel Using Orthogonal Frequency Division Multiplexing", Jul. 1985, IEEE Transactions on Communications, Vol. com–33, No. 7, pp. 665–674.*

"Radio broadcasting systems; Digital Audio Broadcasting (DAB) to mobile, portable, and fixed receivers", European Telecommunication Standard, ETS 300 401, May 1997, $2^{nd}$ edition.*

* cited by examiner

US 6,456,653 B1

FAST AND ACCURATE SIGNAL-TO-NOISE RATIO ESTIMATION TECHNIQUE FOR OFDM SYSTEMS

FIELD OF THE INVENTION

This invention relates generally to a method and apparatus for estimating the signal-to-noise ratio in communications systems.

BACKGROUND OF THE INVENTION

In all communication systems, there are built-in or required performance evaluation or fault detection techniques. The signal-to-noise ratio ("SNR") of the received signal is the ultimate sought after figure of merit for receiver decisions. However, for conventional single carrier systems, there is no way of calculating the SNR without using bandwidth consuming pilot symbols or tones. Therefore, most of these systems rely instead upon a less desirable metric—namely, the total received signal plus noise power.

The most common use of the SNR in communication systems is in conjunction with diversity combining techniques. It is well known that the optimum diversity combining technique is Maximal Ratio Combining ("MRC"). During MRC, different copies of the same information are combined after being weighted by the ratio of the instantaneous signal voltage and the noise power of each copy. See, e.g., W. C. Jakes, *Microwave Mobile Communications*, pp. 399–423, IEEE Press, 1974. In the experimental system described therein, the SNR is estimated by measuring the signal power when the transmitter is turned on and the noise power when the transmitter is turned off. However, this is particularly cumbersome. In a recent personal communication system ("PCS") standard (namely, IS-95-A), MRC is performed using a Rake receiver by weighting the output of each of the fingers of the receiver by the output of the respective pilot fingers. However, even while performing the pilot-aided coherent combining dictated by the standard, the actual weights are not a function of the SNR, but rather are a function of the signal strength plus noise.

SUMMARY OF THE INVENTION

The above-identified problems are solved and a technical advance is achieved in the art by providing a method and apparatus for estimating the signal-to-noise ratio (SNR) in OFDM communication systems. An exemplary method for determining a signal-to-noise ratio in a communication system includes receiving an OFDM symbol comprising a plurality of active sub-carriers and a plurality of inactive sub-carriers; determining a noise power of the inactive sub-carriers and a signal plus noise power of the active sub-carriers; subtracting the noise power from the signal plus noise power to obtain the signal power; and dividing the signal power by the noise power to obtain the SNR.

As previously discussed, the SNR is of critical importance in diversity combining techniques. However, it can also be used in many other applications. For example, it can be used to guide a receiver in making important decisions such as the declaration of carrier lock, system acquisition, data mode failure and the like. In accordance with the present invention, the SNR can now be easily and accurately estimated for use in diversity combining and other applications. Moreover, unlike conventional performance evaluation techniques, the present SNR estimation method does not require any channel sounding and thus, does not require the transmission of special signals such as pilot symbols or pilot tones.

Other and further aspects of the present invention will become apparent during the course of the following description and by reference to the attached drawings.

DETAILED DESCRIPTION

Figure 1:
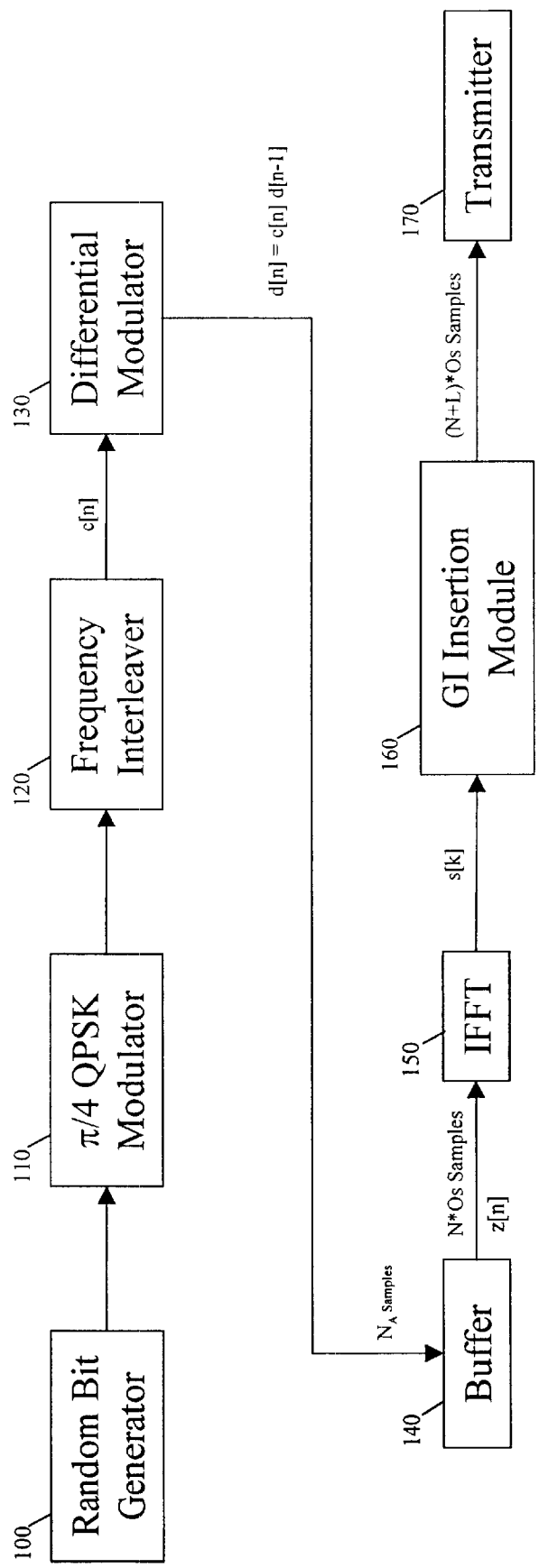
FIG. 1 is a block diagram illustrating an orthogonal frequency division multiplexing (OFDM) transmitter.

The SNR estimation method of the present invention is illustrated in connection with an exemplary OFDM system. The technology referred to as "OFDM" is usually viewed as a collection of transmission techniques and is well-known in the art. When applied in a wireless environment, such as radio broadcasting, the technology is referred to as OFDM. However, in a wired environment, the term discrete multi-tone (DMT) is more commonly used. Although described in connection with an exemplary OFDM system in a wireless environment, it will be understood that the method of the present invention is equally applicable to a DMT system in a wired environment. The functionality performed by the transmitter and receiver sections of the exemplary OFDM system are first described with reference to FIGS. 1 and 2, respectively. The SNR estimation method of the present invention is then described with reference to FIG. 3.

Briefly, in the exemplary OFDM system, a digital signal is transmitted as a plurality of parallel sub-carriers (also known as "bins"). Collectively, these sub-carriers are referred to as an OFDM "symbol". However, only some of the sub-carriers of the OFDM symbol actually contain information about the signal. These sub-carriers are referred to herein as "active" sub-carriers; the remaining sub-carriers are nulled, or, in other words, are filled with zeroes, and thus, are referred to herein as "inactive" sub-carriers. An Inverse Fast Fourier Transform (IFFT) of a significantly longer length than the number of active sub-carriers is then used to encode the signal for transmission to an OFDM receiver. In particular, the IFFT length is maintained at twice the number of sub-carriers in order to properly reproduce the highest frequency sub-carriers and avoid the effects of aliasing.

At the receiver, an FFT is used to decode both the active and inactive sub-carriers. The active sub-carriers will contain the signal plus significant amounts of information concerning the receiver and/or channel noise characteristics. The inactive sub-carriers, which were nulled prior to transmission, will contain only the noise information. Thus, as will be described in detail hereinafter, the SNR for each OFDM symbol can be estimated by taking the ratio of the signal power of the active sub-carriers and the noise power of the inactive sub-carriers. It will be understood that the signal power of the active sub-carriers can be calculated by subtracting the noise power of the inactive sub-carriers from the signal plus noise power of the active sub-carriers.

The design parameters associated with the exemplary OFDM system include: total available bandwidth=F Hz; over-sampling rate=Os; number of active sub-carriers=Na; FFT length=N*Os sub-carriers; sampling duration=ts=(Na/F)/(N*Os) seconds; inter-carrier spacing=F/Na Hz; guard interval=L*Os samples; guard interval duration=Tg=L*Os*ts seconds; useful symbol duration=Tu=Na/F seconds; and total symbol duration=Ts=Tu+Tg seconds. When selecting values for these parameters, several considerations should be borne in mind. First, the FFT length (N*Os) is preferably limited such that the maximum expected Doppler rate of the OFDM system is smaller than the sub-carrier spacing (i.e., F/Na) in order to minimize inter-carrier interference. Second, the FFT length is preferably much larger than the channel delay spread to minimize inter-symbol interference. Third, as mentioned above, the IFFT length is maintained at approximately twice the number of sub-carriers (hence 2× over-sampling) in order to properly reproduce the highest frequency sub-carriers and avoid aliasing effects. In addition, the guard interval duration (Tg) is preferably greater than the maximum expected delay spread of the channel to further minimize inter-symbol interference. Exemplary values for the foregoing system parameters are: F=3.904 MHz; Os=2× over-sampling; Na=976 sub-carriers; N=1024 sub-carriers; FFT Length= 2048 sub-carriers; ts=122.1 nano-seconds; F/Na=4 kHz; L=84; Tg=20.51 micro-seconds; Tu=250 micro-seconds; and Ts=270.5 micro-seconds.

Referring now to the drawings wherein like reference numbers refer to like parts, FIG. 1 is a block diagram illustrating an exemplary orthogonal frequency division multiplexing (OFDM) transmitter. As shown in FIG. 1, a random bit generator 100 is used to generate a digital data stream (i.e., I and Q pairs). The I and Q pairs are fed to a Pi/4 QPSK modulator 110 which generates an active sub-carrier by mapping each I and Q pair to a QPSK constellation. Active sub-carriers from the modulator are then sent to a frequency interleaver 120 where they are frequency interleaved over one OFDM symbol (i.e., Na sub-carriers or, in the exemplary embodiment, 976 sub-carriers). In the exemplary embodiment, the frequency interleaver 120 comprises a matrix of R rows and C columns where R=61 and C=16 to accommodate the 976 active sub-carriers for each symbol. The sub-carriers are written into the matrix row by row and are read therefrom column by column to effect the interleaving. The output of the frequency interleaver 120 (c[n], where, in the exemplary embodiment, n=1 to 976 sub-carriers) is then fed to a differential modulator 130.

Figure 4A:
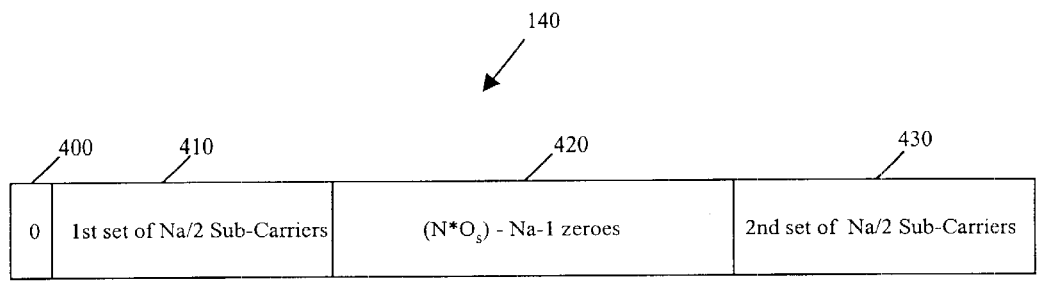
FIG. 4A illustrates an exemplary buffer containing an OFDM symbol.
Figure 4B:
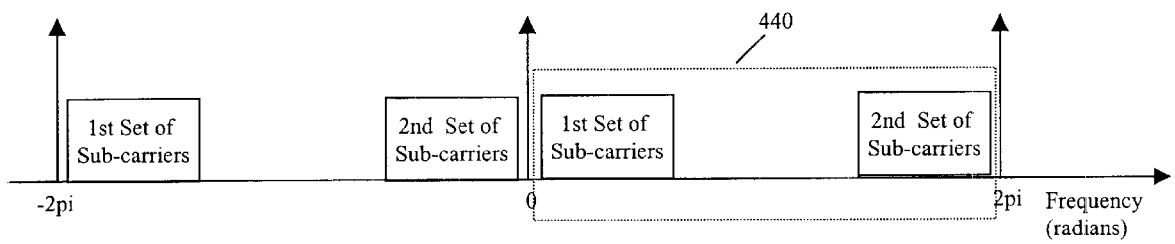
FIG. 4B illustrates the contents of the buffer of FIG. 4A in radian frequency.

The output of the differential modulator 130 comprises complex elements d[n]=c[n]d[n−1], where, in the exemplary embodiment, n=1 to 976 active sub-carriers. The output of the differential modulator 130 for each symbol is then sent to and stored in a buffer 140 of width equal to N*Os sub-carriers. Thus, in the exemplary embodiment, the buffer 140 is 2048 sub-carriers wide. An exemplary buffer having 0 to 2047 locations is illustrated in FIG. 4A. The first location 400 in the buffer 140 is loaded with z[0]=0. This can be used for carrier acquisition as described in the co-pending and contemporaneously filed application entitled "A Fast and Efficient Carrier Acquisition Method for Orthogonal Frequency Division Multiplexed (OFDM) Wireless Systems", which is incorporated herein by reference. The next Na/2 locations 410 in buffer 140 are loaded with the samples corresponding to the first set of Na/2 active sub-carriers. The next (N*Os)−Na−1 locations 420 in buffer 140 are then padded with zeros corresponding to the inactive sub-carriers. As will be discussed hereinafter, the insertion of zeros in these locations of the buffer 140 will facilitate using a larger IFFT size than the number of active sub-carriers thereby ensuring that the highest frequency sub-carriers will be at least 2× over-sampled to eliminate the adverse effects of aliasing. Finally, the last Na/2 locations 430 in the buffer 140 are loaded with samples corresponding to the remaining or second set of Na/2 active sub-carriers. The contents of buffer 140 represents the OFDM symbol in the frequency domain. In radian frequency, the 0th sub-carrier corresponds to 0 radians and the $2047^{th}$ sub-carrier corresponds to 2 pi radians. This is illustrated by reference numeral 440 in FIG. 4B.

The contents of the buffer 140 are then transmitted to an IFFT 150 for conversion from the frequency domain to the time domain. The IFFT 150 is of length N*Os. In the exemplary embodiment, N and Os are 1024 and 2× over-sampling, respectively. The output of the IFFT 150 is the time domain representation of the symbol as defined by:

$$s[k] = \sum_{n=-N_A/2}^{N_A/2} z[n] \cdot \exp(j \cdot 2\pi \cdot n/(N \cdot O_s))$$

Thus, the output of the IFFT 150 will be time domain samples for N*Os sub-carriers or, in the exemplary embodiment, samples for 2048 sub-carriers. As discussed above, however, d[n] will equal zero for n=0 and for each of the (N*Os)−Na−1 inactive sub-carriers. Next, the N*Os samples are sent to GI Insertion Module 160 where a guard interval of length L*Os is added to the symbol. The guard interval is an exact duplicate of the last L*Os samples of the OFDM symbol which gets prepended to the transmitted symbol. In the exemplary embodiment, the length L of the guard interval is 84 samples. Thus, the total length of the transmitted symbol is (N+L)*Os samples or, in the exemplary embodiment, 2,216 samples.

Figure 4C:
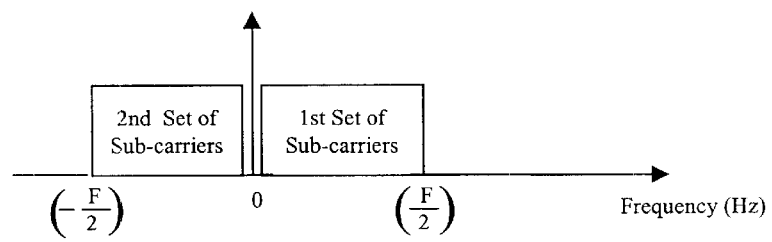
FIG. 4C illustrates an OFDM signal after digital-to-analog conversion and filtering.

Next, the symbol is sent to a transmitter which includes a digital-to-analog (D/A) converter operating at Fs=N*(F/Na) *Os Hz (in the exemplary embodiment, 8.192 MHz) and is converted from digital to analog. The D/A converter imposes a sin x/x spectrum onto each sub-carrier. After D/A conversion, the $0^{th}$ sub-carrier of the symbol will be located at 0 Hz and extend to 4 KHz, and the $2047^{th}$ sub-carrier will be located at 8.188 MHz and extend to 8.192 MHz. However, as is well known in the art, a digital signal replicates itself every 2 pi radians. Thus, the sample and hold function of the D/A converter will serve to filter out any replicas of the symbol and retain only that portion of the symbol extending from $-N*(F/Na)$ Hz to $+N*(F/Na)$ Hz (i.e., −4.096 MHz to +4.096 MHz in the exemplary OFDM system) for transmission to the OFDM receiver. However, the energy content of the inactive sub-carriers is almost zero. Thus, the active sub-carriers will be transmitted such that, as illustrated in FIG. 4C, the $0^{th}$ sub-carrier will be located at 0 Hz, the first set of Na/2 sub-carriers will be located from 0 Hz to F/2 Hz and the second set of Na/2 sub-carriers will be located at −F/2 Hz to 0 Hz.

Figure 2:
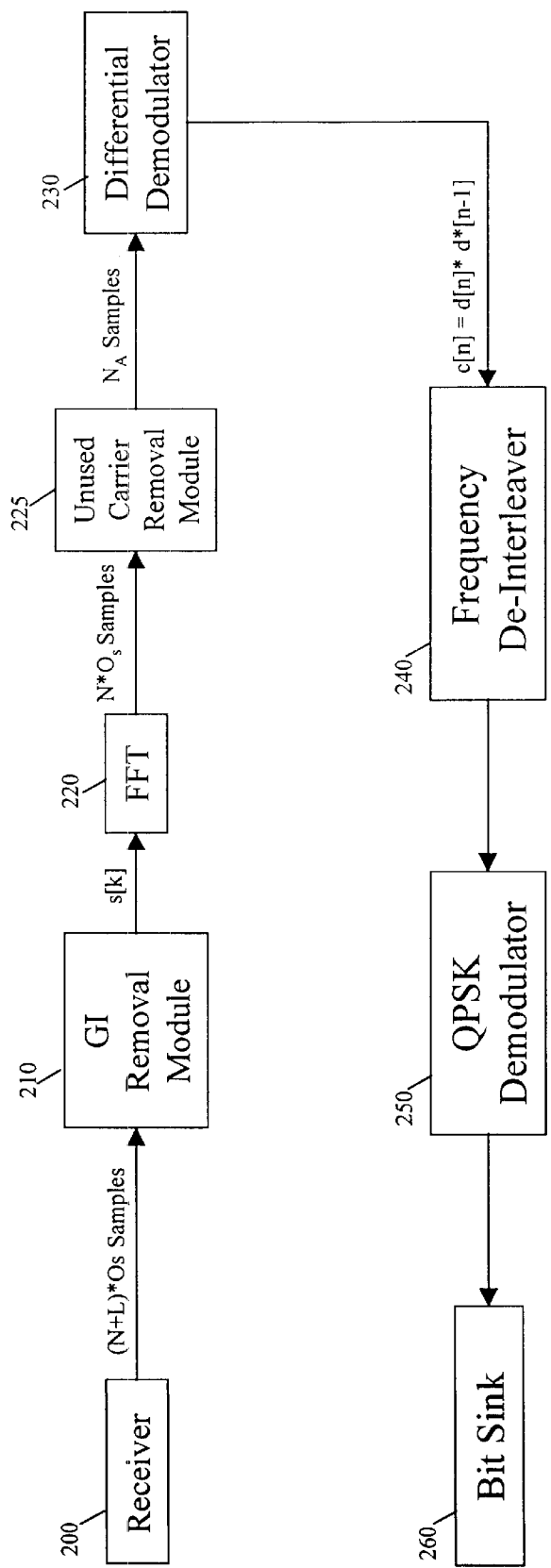
FIG. 2 is a block diagram illustrating an exemplary OFDM receiver.

FIG. 2 is a block diagram illustrating an exemplary OFDM receiver. It will be understood that, in a wireless system, the receiver may be located in a handset, a base station or the like. As shown in FIG. 2, the sub-carriers of the OFDM symbol are received by receiver 200 and converted from analog to digital. Next, the guard interval is removed by GI Removal Module. The symbol is then sent to an FFT 220 for conversion from the time domain to the frequency domain. As discussed above, for purposes of carrier acquisition, a null will be present in the center of the spectrum if the receiver is tuned to the transmit carrier. After the FFT is performed, the inactive sub-carriers are discarded by unused carrier removal module 225 and the complex elements d[n] are sent to a differential demodulator 230. (As will be shown below, rather than discarding the inactive sub-carriers, the method of the present invention uses those sub-carriers to estimate the noise power of the channel and/or receiver.) Demodulation results in active sub-carriers c[n]=d[n]d*[n−1]. The active sub-carriers are then sent to a frequency de-interleaver 240 and thereafter to a QPSK demodulator 250. After QPSK de-modulation, the digital bits are sent to a data sink 260 for application-specific processing.

Figure 3:
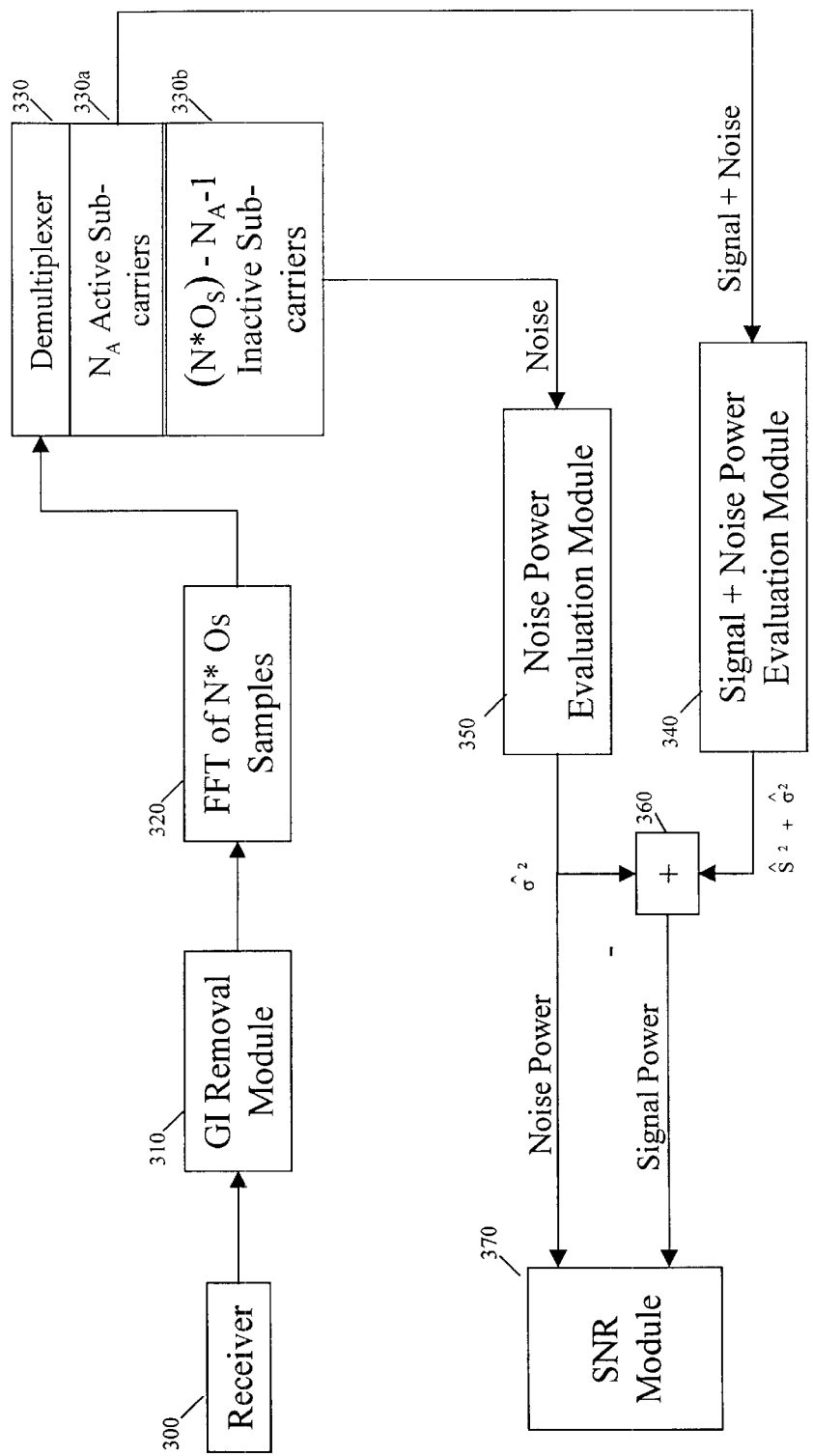
FIG. 3 is a block diagram illustrating the SNR estimation method of the present invention.

FIG. 3 is a block diagram illustrating the SNR estimation technique of the present invention. As shown in FIG. 3, samples corresponding to the sub-carriers of the OFDM symbol are received by receiver 300. The guard interval is then removed by GI Removal module 310 to obtain N*Os sub-carriers. The sub-carriers are sent to an FFT 320 of length L=N*Os. The output of the FFT is stored in a buffer (not shown) of which Na sub-carriers contain information and the remaining N*Os−Na−1 inactive sub-carriers contain only noise. The contents of both the active and the inactive sub-carriers are then sent to a demultiplexer 330. The inactive sub-carriers stored in buffer 330b are sent to a Noise Power Evaluation module 350. The noise power of the inactive sub-carriers is then calculated by module 350 as follows:

$$\hat{\sigma}^2 = \frac{1}{NO_S - N_A - 1} \sum_{k=1}^{NO_S - N_A - 1} |n_k|^2$$

Where nk is the output of the FFT 320 of the inactive sub-carriers. Next, the samples in the active sub-carriers stored in buffer 330a are sent to the Signal+Noise Power Evaluation module 340 where the signal plus noise power of the samples in the active sub-carriers is calculated as follows:

$$\hat{S}^2 + \hat{\sigma}^2 = \frac{1}{N_A} \sum_{k=1}^{N_A} |S_k + n_k|^2$$

Where sk+nk is the output of the FFT 320 of the active sub-carriers. The signal power is then calculated by module 360 by subtracting the noise power of the inactive sub-carriers from the signal plus noise power of the active sub-carriers. The noise power and the signal power are then sent to SNR module 370 where the SNR is calculated as follows:

$$SNR = \frac{\hat{S}^2}{\hat{\sigma}^2}$$

Given the present disclosure, it will be understood by those of ordinary skill in the art that the SNR calculation technique of the present invention may be readily implemented using one or more processors in communication with a memory device having embodied therein stored programs for performing the above-described SNR calculation technique.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

I claim:

1. A method for determining a signal-to-noise ratio in a communication system, comprising:
   receiving a symbol comprising a plurality of active sub-carriers and a plurality of inactive sub-carriers;
   determining a noise power of the inactive sub-carriers and a signal plus noise power of the active sub-carriers;
   subtracting the noise power from the signal plus noise power to obtain the signal power; and
   calculating the ratio of the signal power and the noise power.

2. The method of claim 1 wherein the symbol is an OFDM symbol.

3. The method of claim 1 wherein the symbol is a DMT symbol.

4. The method of claim 1 further comprising:
   removing a guard interval associated with the symbol;
   calculating an FFT of the active and inactive sub-carriers; and
   demultiplexing the active sub-carriers and the inactive sub-carriers.

5. An apparatus for determining a signal-to-noise ratio, comprising:
   a memory device having embodied therein information relating to signal-to-noise ratio calculations;
   a processor in communication with said memory device, said processor configured to receive a symbol comprising a plurality of active sub-carriers and a plurality of inactive sub-carriers; determine a noise power of the inactive sub-carriers and a signal plus noise power of the active sub-carriers; obtain the signal power by subtracting the noise power from the signal plus noise power; and calculate the ratio of the signal power and the noise power.

6. The system of claim 5 wherein the symbol is an OFDM symbol.

7. The system of claim 5 wherein the symbol is a DMT symbol.

8. The system of claim 5 wherein said processor is further configured to remove a guard interval associated with the symbol; calculate an FFT of the active and inactive sub-carriers; and demultiplex the active sub-carriers and the inactive sub-carriers.

9. An apparatus for determining a signal-to-noise ratio in a communication system, comprising:

means for receiving symbol comprising a plurality of active sub-carriers and a plurality of inactive sub-carriers;

means for determining a noise power of the inactive sub-carriers and a signal plus noise power of the active sub-carriers;

means for subtracting the noise power from the signal plus noise power to obtain the signal power; and means for calculating the ratio of the signal power and the noise power.

10. The apparatus of claim 9 wherein the symbol is an OFDM symbol.

11. The apparatus of claim 9 wherein the symbol is a DMT symbol.

12. The apparatus of claim 9 further comprising:

means for removing a guard interval associated with the symbol;

means for calculating an FFT of the active and inactive sub-carriers; and means for demultiplexing the active sub-carriers and the inactive sub-carriers.

* * * * *